UNITED STATES PATENT OFFICE.

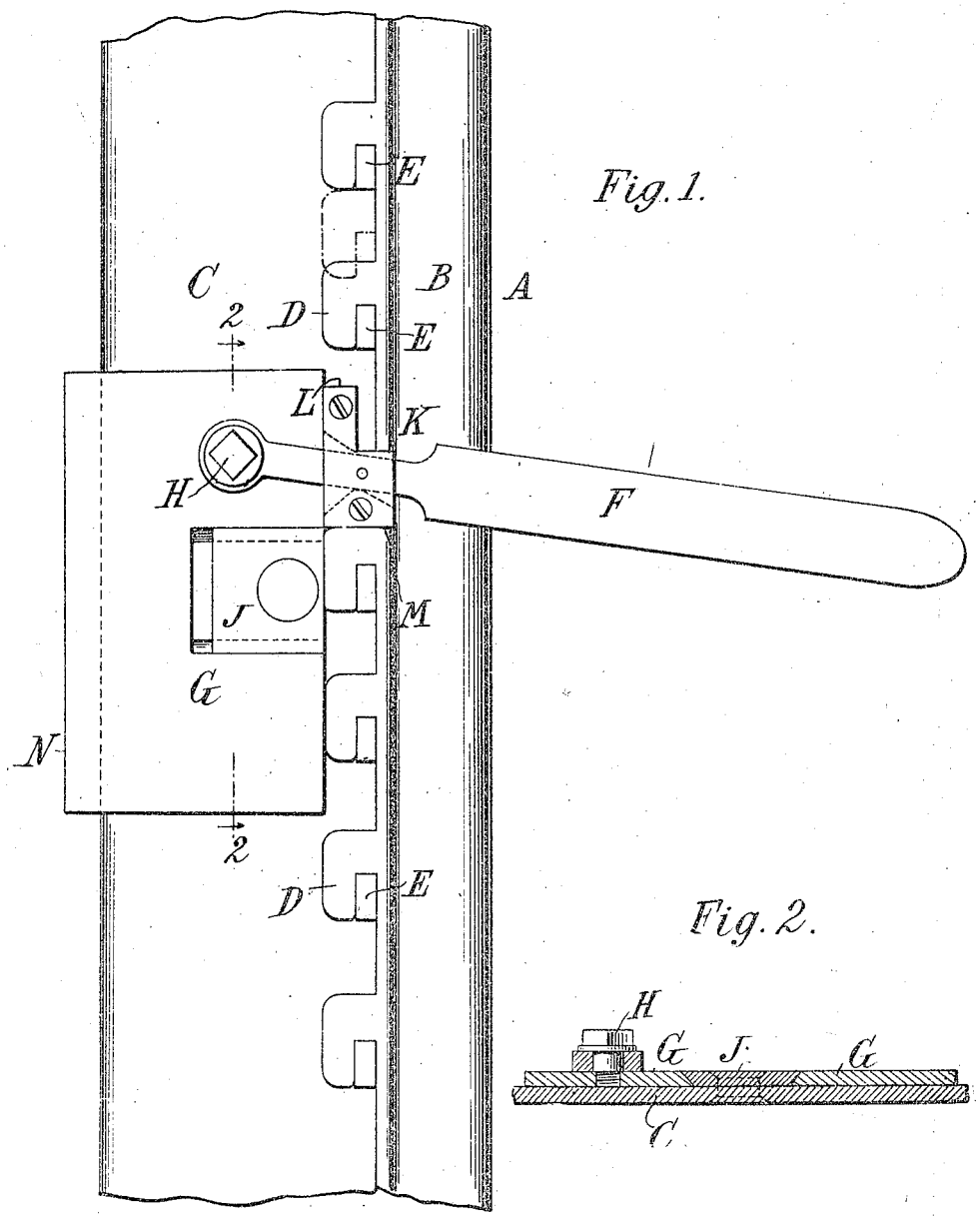

HENRY P. KRAFT, OF RIDGEWOOD, AND PHILIP W. KAUTZMAN, OF WEST HOBOKEN, NEW JERSEY, ASSIGNORS, BY MESNE ASSIGNMENTS, OF ONE-HALF TO THE B. F. GOODRICH COMPANY, OF NEW YORK, N. Y., A CORPORATION OF NEW YORK, ONE-FOURTH TO THE GOODYEAR TIRE & RUBBER COMPANY, OF AKRON, OHIO, A CORPORATION OF OHIO, AND ONE-FOURTH TO UNITED STATES TIRE COMPANY, OF NEW YORK, N. Y., A CORPORATION OF NEW YORK.

TOOL FOR LOCKING AND OPENING SPLIT RIMS.

1,201,197. Specification of Letters Patent. Patented Oct. 10, 1916.

Application filed July 14, 1910. Serial No. 571,938.

*To all whom it may concern:*

Be it known that we, HENRY P. KRAFT, residing in Ridgewood, in the county of Bergen and State of New Jersey, and PHILIP W. KAUTZMAN, residing in West Hoboken, in the county of Hudson and State of New Jersey, both citizens of the United States, have invented certain new and useful Improvements in Tools for Locking and Opening Split Rims, of which the following is a specification.

This invention relates to tools for manipulating pneumatic tire rims.

It has heretofore been proposed to construct a rim for pneumatic tires in two sections, which sections are provided with interlocking lugs or similar devices which require a rotary movement of one part relatively to the other in order to lock them together. With a heavy rim and the necessary friction between the parts it has been found difficult in certain cases to manipulate the parts by hand.

The object of the present invention is to provide a tool which will easily and quickly perform the operation of locking and unlocking the rim sections.

Referring to the drawings in which we have illustrated one form of our invention,—

Figure 1 is an inner side view of a rim of the type referred to showing the tool in operative position. Fig. 2 is a section on the line 2—2 in Fig. 1.

In the drawings let A indicate a pneumatic tire rim composed of two sections B and C. In the construction shown the sections are adapted to be held together against lateral displacement by hooks D formed on one section and engaging lugs E formed on the other section. In order to engage the lugs with the hooks, the section B for instance is placed upon the section C with its hooks in the dotted line position and one or the other section is rotated relatively to the other in order to engage the hooks and lugs. This construction is one example of a rim to which our improved device is applicable, although the invention may be modified to operate upon other constructions of rim.

In the construction shown the device includes a tire manipulating means such as the lever F adapted to bear against one section of the rim, and means for temporarily connecting said lever with the other section of the rim or a part carried thereby. In the construction shown we provide a plate G upon which the lever F is mounted at H, and this plate G is adapted to fit over a block J connected to the section C of the rim. Preferably the plate is provided with a recess and is adapted to embrace the block J, the edges of the plate and block being correspondingly beveled as shown in Fig. 2, so that the plate cannot slip out of engagement with the block. The pivotal point H of the lever F is preferably arranged at one side of the block J, and the lever is adapted to operate upon the hooks D, preferably to both engage and disengage the hooks. To this end it is desirable to provide the lever with a pivoted block K which is so formed that on one side it will engage the end of one of the hooks without engaging the lug E and on the other side will engage the base of the next adjacent hook. To this end the pivoted block K is provided with a narrow bearing surface L at one end and with a broad bearing surface M at the other end. Furthermore, the block is arranged to slide along the edge of the plate G so that it is guided in its movements and always strikes the hook D at the proper point.

In Fig. 1 of the drawings the tool is shown in position at the end of the engaging movement of the rim sections, the rim B having been rotated sufficiently to cause such engagement.

It is very desirable that the same tool be applicable to different widths of rim. For this purpose the recess in the plate G is somewhat longer than necessary, so that the edge of the plate will abut against the faces of the hooks D. Under these circumstances if the sections are fitted together the block K will always assume the proper position with relation to the hooks and lugs. The plate G is best made considerably wider than any rim in use so that its lower edge N will rest upon the floor or ground when the tool is in use. This will elevate one side of the rim slightly above the ground and force the plate G against the hooks. If the plate G were of less width than the rim, it would be apt to slip down in use and throw the pivoted block K out of operative relation with the hooks D.

In use the rim section C is laid flat upon the ground, the tire inserted in place, and the upper section B applied to the lower section. The plate G of the tool is then slipped into engagement with the block J and by a single movement of the handle the section B of the rim is rotated until the hooks D engage the lugs E. The rim sections may then be locked in any suitable manner. When it is desired to remove the tire the tool is placed in the position shown in Fig. 1 and the lever F moved in the opposite direction, whereupon the reduced face L engages the end of the next adjacent hook and gives the rim section B a rotative movement in a direction to disengage the parts. The section B may then be lifted off and the tire removed.

While we have shown in detail one form of our device, it will be understood that we do not wish to be limited thereto as various modifications within the scope of the claims may be made therein without departing from the invention. The form illustrated is best adapted for the type of rim shown, but for other types of rim suitable changes will be made in the tool.

What we claim is:—

1. A tool for vehicle wheel rims comprising a plate having a recess adapted to receive a part formed upon a section of such rim, and having a lever pivoted thereto, said lever having a pivoted block adapted to engage the other section of said rim.

2. A tool for actuating interlocking sections of tire carrying rims comprising a fulcrum member adapted to be detachably secured to one rim-section and having a surface engagement with the inner surface of said rim-section, an operating lever having its one end pivotally secured to said fulcrum member, and means on said lever arranged to engage the other rim-section for rotating said rim-sections relatively to each other in opposite directions.

3. A tool for actuating interlocking sections of tire-carrying rims comprising a fulcrum member adapted to be detachably secured to one rim-section, an operating lever having its one end pivotally secured to said fulcrum member and projections located on opposite edges of said lever arranged to engage the other rim-section for rotating said rim-sections relatively to each other in opposite directions.

4. A tool for actuating interlocking sections of tire-carrying rims comprising a notched fulcrum member adapted to detachably engage one rim-section through the medium of said notch, an operating lever movably secured to said fulcrum member and means on said lever arranged to engage the other rim-section for rotating said rim-sections relatively to each other in opposite directions.

5. A tool for actuating interlocking sections of tire-carrying rims comprising a fulcrum plate recessed for detachable connection to one rim-section, an operating lever pivoted on said plate, and a power exerting element pivotally secured to said lever and extending beyond opposite edges thereof, said power exerting element being arranged to engage the other rim-section and movable along the one edge of said fulcrum plate to rotate said rim-sections relatively to each other in opposite directions.

6. A tool for actuating the sections of a tire-carrying rim comprising a fulcrum member, a lever pivoted thereto, and an engaging member pivotally attached to said lever and contacting slidably with said fulcrum member.

7. A tool for actuating the sections of a tire-carrying rim comprising a plate serving as a fulcrum, a lever having one end pivoted to said plate, and an engaging plate-member mounted on said lever remote from the pivotal point and slidably contacting with the edge of the first-mentioned plate.

8. A tool for actuating the sections of a tire-carrying rim comprising a transversely slotted plate, a lever pivotally secured adjacent the slot, and a rectangular notched plate-engaging member pivotally attached to said lever and slidably mounted to move along the edge of said slotted plate member, said notched member being adapted to contact adjacent the notch with a locking portion of the rim to thereby move the sections of the rim relatively to one another.

In witness whereof, we have hereunto signed our names in the presence of two subscribing witnesses.

HENRY P. KRAFT.
PHILIP W. KAUTZMAN.

Witnesses:
EUGENE V. MYLES,
THOMAS F. WALLACE.